Figure 1:
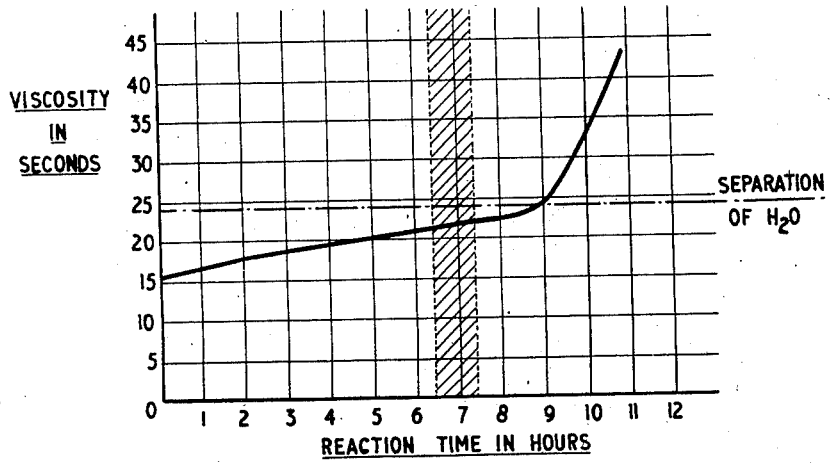

May 26, 1953          R. H. STURM          2,640,043

PHENOL-ALDEHYDE-KETONE RESINS

Filed Dec. 20, 1949

Inventor
ROBERT H. STURM

By    Attorney

Patented May 26, 1953

2,640,043

UNITED STATES PATENT OFFICE 2,640,043

PHENOL-ALDEHYDE-KETONE RESINS

Robert Heinrich Sturm, Enfield, England, assignor to Cosmocord Plastics Limited, Enfield, England, a British company Application December 20, 1949, Serial No. 134,037
In Great Britain May 29, 1946

7 Claims. (Cl. 260—45.1)

This invention relates to plastic compositions and is a continuation-in-part of my application No. 754,069, filed on June 11, 1947. The invention is more particularly concerned with the production of coatings of plastic material upon thermo-setting mouldings or laminates.

For certain purposes for which phenol-aldehyde compositions are suitable there is a requirement for shades which cannot be obtained directly in the material itself, whilst other plastic compositions which give the desired shades are not satisfactory in use. Also surface layers of urea or melamine-aldehyde compounds do not bond satisfactorily to thermo-setting mouldings or laminates especially not on phenolics, and cannot therefore be used satisfactorily for coating phenol-aldehyde compositions.

The present invention has for its object to provide a plastic composition which can be applied to thermo-setting compositions as a coating or paint for decoration or for printing or the like and according to the invention there is provided a plastic composition for coating or printing on thermo-setting materials, consisting of an inter-condensation product of a cyclic ketone of five or six membered rings or a mixture of such ketones with phenol-aldehyde and urea or melamine in butyl- or octyl-alcohol alone or the aforesaid alcohols in mixture with alcohols which may contain 5 to 7 carbon atoms.

In carrying the invention into effect, the steps which are preferred and which will be described, by way of example, with reference to the accompanying drawings, are as follows:

(a) Phenol and a cyclic ketone of five or six membered rings such as for instance cyclopentanone or cyclohexanone or a mixture thereof are condensed with hexamethylenetetramine, or are condensed with formaldehyde with a basic catalyst such as a mixture of ammonium hydroxide and sodium hydroxide, in the presence of butyl- or octyl-alcohol, or in the presence of an alcohol mixture which at least contains 50% of aforesaid alcohols, and the remaining proportion contains higher alcohols of 5 to 7 carbon atoms as for instance amyl- or hexyl-alcohol.

The molar ratio of formaldehyde to phenol preferably is at least 2.5 to 1 to allow in the initial reaction the formation of large amounts of phenol alcohols, especially of di- and tri-methylol phenols which combine in the progressive condensation to methylene linked chains of varying structures and sizes, whereby such a mixture is characteristic for its hydrophyllic properties.

The condensation is carried out in the presence of a cyclic ketone with five or six membered rings, preferably with cyclohexanone. Such a ketone combines partly in the course of the condensation with such amounts of formaldehyde which have remained unreacted in the condensation mixture.

The molar ratio of cyclohexanone to phenol should not exceed 0.4 to 1 when the ratio of phenol to formaldehyde is 1 to 2.5. If a higher proportion of cyclohexanone is to be intercondensed the ratio of formaldehyde to phenol has to be increased accordingly.

Although the amount of phenol alcohols, formed by the direct substitution of the benzene nucleus, representing a mixture of ortho- and para-mono-methylol phenols and ortho-ortho and ortho-para-di-methylol phenols and ortho-ortho-para-tri-methylol phenols, is high, accounting for the reaction with large amounts of the aldehyde, distillation tests have proved the presence of free, unreacted formaldehyde which in the course of the condensation reacts with parts of the cyclic ketone. Such parts of the cyclic ketone which remain unreacted act simply as a solvent in the mixture.

It has been found that the reaction in presence of such a cyclic ketone is considerably slower, and furthermore the initial exothermic reaction between phenol and formaldehyde is less vigorous, allowing an accurate control over the condensation process.

The condensation process is carried to the stage where the condensate is a stable colloid with hydrophyllic properties, that is to a stage where the methylene linked chains formed by the phenol alcohols have not started to form cross linkages.

An indication for the progressive condensation is the increase of the viscosity as shown in Fig. 1. The shaded area A indicates the stage where the process is arrested by neutralising the condensate. The line indicating the separation of water represents the viscosity value of the condensate, as measured on a Ford cup No. 3, at which the condensate ceases to be hydrophillic and becomes hydrophobic in character.

If the process is not arrested by neutralising or slightly acidifying, the condensate would progressively increase its viscosity with separation of water, and would so become a hydrophobic colloid impossible to intercondense further with urea or melamine respectively.

(b) The first stage in the inter-condensation process as described under (a) above and with the reactants in proportions as formulated in Example 1 below is carried out at a temperature of 95.5 degrees centigrade, and as shown in Fig. 1 is arrested by neutralisation or slight acidification after a reacting time of 6.5 to 7.5 hours, The neutralisation of slight acidification to a pH value of 5.5 to 6 is achieved with such acids as for instance a mixture of salicylic acid and lactic acid in ratio 2 to 1, or sulphonic acids such as benzene- or p-toluene-sulphonic acid or oxalic acid.

These acids or mixture of acids are added to the condensate at a temperature of 75 to 80 degrees centigrade, and are kept in solution by the water present in the condensate. These acid mixtures or acids have proved satisfactory as a catalyst and also for improving the bonding strength of the final coating composition.

For the inter-condensation, the molar ratio of urea in relation to phenol is kept within the range of 2 to 4 mols urea to 1 mol phenol. Higher proportions of urea are from a practicable point of view unsatisfactory, resulting in coating compositions with poorer weathering resistance.

(c) Urea is dissolved in a 40% aqueous formaldehyde solution in a molar ratio within the range of 2 to 3 mols of formaldehyde to 1 mol of urea. The formaldehyde solution is first neutralised or made slightly alkaline within the pH range of 7 to 8, depending on the pH value of the condensate described under (b).

The urea-formaldehyde solution is added to the condensate (b) and the temperature of the mixture is raised to 85° C. At this temperature the condensate is kept for 1.25 to 1.45 hours under reflux.

The initial reaction of urea with formaldehyde is the formation of mono- and further of di-methylol urea which in presence of butyl- or octyl-alcohol or with a mixture of such alcohols with other higher alcohols containing 5 to 7 carbon atoms will be modified by esterification.

Such a modification prevents the formation of di-methylene urea groups which would confer hydrophobic properties to the resin.

(d) The intercondensate in solution resulting from the process described under (a), (b) and (c) contains an agglomeration of chains formed by the phenol and urea alcohols whereby the solution is a stable emulsion containing further the higher alcohols, esters, unreacted cyclic ketone, water and the reaction products of the acids in form of salts and esters.

By means of a high capacity vacuum pump and under a reduced pressure of 10 inches of mercury at a temperature of 70 to 75° C., the bulk of the water in the solution is removed, accounting for 240 to 250 parts in the formulation as described in Example 1 below.

Small quantities of water are tenaciously held, and left to remain in the resin syrup, in quantities from 4 to 8% of the bulk removed.

As indicated in the above paragraph, the distillation of the intercondensate is accomplished at a relatively low vacuum to avoid rapid polymerisation and a sudden phase separation. The viscosity of the intercondensate increases steadily with the corresponding elimination of water, and also by the progressive condensation-polymerisation of the intercondensate.

Figure 2:
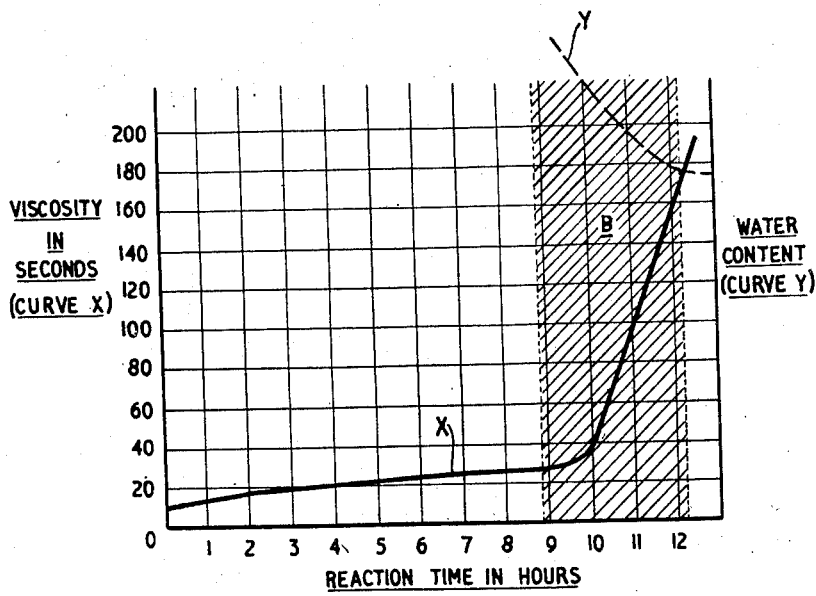

In Fig. 2 curve X illustrates the increase of the viscosity during the distillation stage which is indicated in the graph by the shaded area B, and curve Y illustrates the corresponding decrease in the water content.

(e) The intercondensate obtained in the manner described is then further diluted with a ternary solvent system wherein the water contained in the syrup is one part of the system. As an example for such a solvent system, ethylene glycol monobutyl ether and benzene is formulated in Examples 1 and 2. A further example of such a system would be the mixture of toluene and acetone.

Finally the pH value is adjusted to 4.5 by adding acids or mixtures of acids of the kind described under (b) above.

(f) As an alternative to step (c) melamine, instead of urea is intercondensed with the cyclic ketone - phenol - formaldehyde condensate produced from steps (a) and (b).

There is no strict limitation to the amount of melamine used in relation to the phenol. Satisfactory coating compositions have been made within a range of 0.5 to 3 mols of melamine to 1 mol of phenol.

From 5 to 6 mols formaldehyde are reacted with 1 mol melamine at a temperature of 80° C. under reflux in the intercondensate as prepared under (a) and (b).

Melamine condenses readily to the stage where hexa-methylol melamine groups are formed which similar to the process described with urea, undergo esterification with the alcohol or alcohols present.

The distillation process of the intercondensate is the same as described under (d) for the urea condensate, and further dilution is as described under (e).

The final pH value can be increased to 4.2 by adding acids or mixtures of acids as described under (b).

The following are two specific examples of the constituents, and proportions thereof, which may be used at the various stages for producing coating materials according to the invention:

EXAMPLE 1

For a cyclic ketone-phenol urea formaldehyde coating compound

Stage (a)

| | Parts by weight |
|---|---|
| Formaldehyde solution 40% | 125 |
| Cyclohexanone | 25 |
| Phenol | 50 |
| n-Butyl alcohol | 200 |
| Ammonia solution 20° Bé | 17 |
| Sodium hydroxide | 1.25 |

Stage (b)

| | |
|---|---|
| Salicylic acid | 2.88 |
| Lactic acid | 1.44 |
| n-Butyl alcohol | 25 |

Stage (c)

| | |
|---|---|
| Urea | 100 |
| Formaldehyde solution 40% neutral | 330 |

Stage (e)

| | |
|---|---|
| Benzene | 40 |
| Ethylene glycol mono butyl ether | 120 |
| Salicylic acid | 0.72 |
| Lactic acid | 0.36 |

For a cyclic ketone-phenol-melamine formaldehyde coating compound

EXAMPLE 2

Stage (a)

| | Parts by weight |
|---|---|
| Formaldehyde solution 40% | 125 |
| Cyclohexanone | 10 |
| Methyl-cyclohexanone | 15 |
| Phenol | 50 |
| n-Butyl alcohol | 180 |
| Ammonia solution 20° Bé | 17 |
| Sodium hydroxide | 1 |

Stage (b)

| | |
|---|---|
| Salicylic acid | 3 |
| Lactic acid | 1.5 |
| n-Butyl alcohol | 20 |

Stage (c)

| | |
|---|---|
| Melamine | 50 |
| Formaldehyde solution 40% | 190 |

Stage (e)

| | |
|---|---|
| Benzene | 10 |
| Ethylene glycol mono butyl ether | 60 |
| Salicylic acid | 1 |
| Lactic acid | 0.5 |

Coating compounds according to the present invention made from chemically pure materials in a corrosion proof autoclave fitted with stirrer, reflux condenser, vacuum pump and receiver, have been found to exhibit qualities of good lightfastness with no tendency to after-yellowing, resistance to heat and to corrosion by the usual alkalies and acids, good bonding to thermosetting compounds, especially phenolics, rapid curing and good wearing qualities.

The compounds are compatible with a wide range of plasticisers and especially also with nondrying oil modified alkyd resins.

What I claim is:

1. The method of producing a condensation product capable of tightly bonding as a coating to thermosetting moldings and laminates which comprises condensing a first mixture comprising phenol, a cyclic ketone of the group consisting of cyclopentanone, cyclohexanone and methyl cyclohexanone, formaldehyde, a basic catalyst and an alcohol of the group consisting of butyl and octyl alcohol, said condensation being carried out at an elevated temperature and for a time sufficient to produce a stable colloid with hydrophillic properties and being then arrested by acidification to a pH value of about 5.5 to 6, the ratio of reactants in said mixture being at least 2.5 mols of formaldehyde and at least 0.4 mol of ketone to each mol of phenol, adding to said stable colloid formaldehyde and an amide of the group consisting of urea and melamine, the ratio of the added amide to the added formaldehyde being about 1 mol of amide to from 2 to 6 mols of formaldehyde and the ratio of added amide to the phenol in said first mixture being from about 0.5 to 4 mols of the amide to 1 mol of phenol, reacting the resulting mixture at a temperature of the order of 80–85° C. for from about 1.25 to about 1.45 hours, removing the bulk of the water from the resulting reaction mixture by distillation under reduced pressure and at a temperature not exceeding about 75° C., diluting the resulting mixture with organic solvent and adjusting the pH value of the resulting composition to about 4.2–4.5.

2. The method as defined in claim 1 in which the first mixture is condensed at a temperature of about 95.5° C. for about 6.5 to 7.5 hours.

3. The method as defined in claim 1 in which the acidification is effected by the addition of an acid of the group consisting of benzene sulphonic acid, p-toluene sulphonic acid, oxalic acid and a mixture of salicylic acid and lactic acid.

4. The method as defined in claim 1 in which the ratio of reactants in the first mixture is about 0.5 mol of the ketone to 1 mol of phenol and about 3 mols of formaldehyde and the ratio of the added formaldehyde and amide is about 8 mols of formaldehyde and 3 mols of amide; said amide being urea.

5. The method as defined in claim 1 in which the ratio of reactants in the first mixture is about 1 mol of phenol, about 0.5 mol of ketone and about 3 mols of formaldehyde and the ratio of the added formaldehyde and amide is about 4.5 mols of formaldehyde and about .75 mol of amide, said amide being melamine.

6. The method as defined in claim 1 in which the amide is urea and is added to the stable colloid together with the formaldehyde in the form of a solution of 2 to 4 mols of urea to each mol of phenol in the first mixture in a 40% aqueous solution of from 4 to 12 mols of formaldehyde, said solution of urea in aqueous formaldehyde having a pH value within the range from 7 to 8.

7. The method as defined in claim 1 in which the amide is melamine and is added to the stable colloid together with formaldehyde in the form of a solution of from 0.5 to 3 mols of melamine to each mol of phenol in the first mixture in a 40% aqueous solution of about 2.5 to 18 mols of formaldehyde.

ROBERT HEINRICH STURM.

References Cited in the file of this patent

UNITED STATES PATENTS

| Number | Name | Date |
|---|---|---|
| 1,989,951 | Sussenguth | Feb. 5, 1935 |
| 2,205,427 | Loos | June 25, 1940 |

FOREIGN PATENTS

| Number | Country | Date |
|---|---|---|
| 678,282 | France | Dec. 23, 1939 |

OTHER REFERENCES

Ser. No. 368,611, Sandig (A. P. C.), published Apr. 20, 1943.